(12) United States Patent
Heldt-Sheller et al.

(10) Patent No.: US 10,075,443 B2
(45) Date of Patent: Sep. 11, 2018

(54) SYSTEM, APPARATUS AND METHOD FOR STATEFUL APPLICATION OF CONTROL DATA IN A DEVICE

(71) Applicant: Intel Corporation, Santa Clara, CA (US)

(72) Inventors: Nathan Heldt-Sheller, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 14/863,496

(22) Filed: Sep. 24, 2015

(65) Prior Publication Data
US 2016/0366136 A1 Dec. 15, 2016

Related U.S. Application Data

(60) Provisional application No. 62/172,968, filed on Jun. 9, 2015.

(51) Int. Cl.
*H04L 29/06* (2006.01)

(52) U.S. Cl.
CPC ............ *H04L 63/10* (2013.01); *H04L 63/101* (2013.01); *H04L 63/20* (2013.01)

(58) Field of Classification Search
CPC ....... H04L 63/10; H04L 63/20; H04L 63/101; H04L 29/06
USPC ................... 726/1, 4, 5, 12, 26–30; 713/182
See application file for complete search history.

(56) References Cited

U.S. PATENT DOCUMENTS

| 2002/0029349 A1 | 3/2002 | Daigneault et al. |
| 2012/0042362 A1 | 2/2012 | Vlasov et al. |
| 2013/0263287 A1 | 10/2013 | Ayyalasomayajula et al. |
| 2014/0123276 A1* | 5/2014 | Bush .................. G06F 21/31 726/21 |
| 2014/0130180 A1 | 5/2014 | Balasubramanyan et al. |
| 2015/0249672 A1* | 9/2015 | Burns .................. H04L 12/66 726/4 |

FOREIGN PATENT DOCUMENTS

WO  2011025765  3/2011

OTHER PUBLICATIONS

Wikipedia, "OSI Model", https://en.wikipedia.org/wiki/OSI_model#Layer_4:_Transport_Layer, Jun. 8, 2015, 7 pages.

(Continued)

*Primary Examiner* — Ashok Patel
*Assistant Examiner* — Quazi Farooqui
(74) *Attorney, Agent, or Firm* — Trop, Pruner & Hu, P.C.

(57) ABSTRACT

In one embodiment, a system includes a processor having a first logic to execute in a trusted execution environment, and a storage to store a plurality of access control policies, each of the plurality of access control policies associated with a composite device state of the system and including an access policy for a resource to be protected by the first logic, where the first logic is to apply one or more of the plurality of access control policies to a request for access to the resource, responsive to a matching of the associated composite device state of the one or more access control policies with a current composite device state of the system. Other embodiments are described and claimed.

17 Claims, 7 Drawing Sheets

(56) References Cited

OTHER PUBLICATIONS

Wikipedia, "Key Management", https://en.wikipedia.org/wiki/Key_management, May 19, 2015, 5 pages.
Wikipedia, "Publish-Subscribe Pattern", https://en.wikipedia.org/wiki/Publish%E2%80%93subscribe_pattern, Mar. 18, 2015, 4 pages.
Wikipedia, "Data Distribution Service", https://en.wikipedia.org/wiki/Data_Distribution_Service, May 21, 2015, 5 pages.
Wikipedia, "Kerberos (Protocol)", https://en.wikipedia.org/wiki/Kerberos_%28protocol%29, May 7, 2015, 6 pages.
StackExchange, "Cryptography", http://crypto.stackexchange.com/questions/3682/how-can-the-diffie-hellman-key-exchange-be-extended-to-three-parties, Aug. 30, 2012, 1 page.
Wikipedia, "XMPP", https://en.wikipedia.org/wiki/XMPP, May 22, 2015, 7 pages.
IBM MobileFirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.
Hardjono, et al., "Fluffy: Simplified Key Exchange for Constrained Environments", draft-hardjono-ace-fluffy-00, Mar. 23, 2015, 24 pages, Intel Corporation.
openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.
openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.
openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.
openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.
U.S. Appl. No. 14/863,043, filed Sep. 23, 2015, entitled "System, Apparatus and Method for Group Key Distribution on for a Network" by Ned M. Smith.
U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.
U.S. Appl. No. 14/864,957, filed Sep. 25, 2015, entitled "System, Apparatus and Method for Managing Lifecycle of Secure Publish-Subscribe System" by Ned M. Smith, et al.
U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.
U.S. Appl. No. 14/865,191, filed Sep. 25, 2015, entitled "System, Apparatus and Method for Multi-Owner Transfer of Ownership of a Device" by Jesse Walker, et al.
U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.
U.S. Appl. No. 14/856,857, filed Sep. 17, 2015, entitled "System, Apparatus and Method for Access Control List Processing in a Constrained Environment" by Ned M. Smith, et al.
U.S. Appl. No. 14/859,572, filed Sep. 21, 2015, entitled "System, Apparatus and Method for Privacy Preserving Distributed Attestation for Devices" by Ned M. Smith, et al.
U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.
U.S. Appl. No. 15/045,676, filed Feb. 17, 2016, entitled "System, Apparatus and Method for Security Interoperability Path Analysis in an Internet of Things (IOT) Network" by Ned M. Smith, et al.
U.S. Appl. No. 62/172,962, filed Jun. 9, 2015, entitled "Providing Protected Content in an IoT Network" by Ned M. Smith, et al.
U.S. Appl. No. 14/968,125, filed Dec. 14, 2015, entitled "A Self-Configuring Key Management System for an Internet of Things Network" by Ned M. Smith.
U.S. Appl. No. 14/757,750, filed Dec. 23, 2015, entitled "System, Apparatus and Method for Optimizing Symmetric Key Cache Using Tickets Issued by a Certificate Status Check Service Provider" Ned M. Smith, et al.
U.S. Appl. No. 14/976,165, filed Dec. 21, 2015, entitled "System, Apparatus and Method for Migrating a Device Having a Platform Group" by Ned M. Smith, et al.
U.S. Appl. No. 14/977,742, filed Dec. 22, 2015, entitled "System, Apparatus and Method for Safety State Management of Internet Things (IoT) Devices " by Ned M. Smith, et al.
Wikipedia, "Tor", https://en.wikipedia.org/wiki/Tor_%28anonymity_network%29 , Jun. 4, 2015, 14 pages.
NetworkWorld, "A guide to the confusing Internet of Things standards world", http://www.networkworld.com/article/2456421/internet-of-things/a-guide-to-the-confusing-internet-of-things-standards-world.html, Jul. 21, 2014, 7 pages.
International Searching Authority, "Notification of Transmittal of the International Search Report and the Written Opinion of the International Searching Authority," dated Sep. 9, 2016 in International application No. PCT/US2016/035078.

* cited by examiner

FIG. 2A

| ACL Name | isOp | IsOwned | isProv | hasKeys | inReset | isConnect | inError | inEmerg |
|---|---|---|---|---|---|---|---|---|
| ACL-1 | X | X | X | X | | X | | |
| ACL-2 | X | X | X | X | | X | | X |

FIG. 2B — ACL-1

| ACL-1 | Security Personnel | Regular Employee | Fire Department |
|---|---|---|---|
| Thermostat | Full Control | Read Only | No Access |
| Main Entry | Full Control | Unlock Only | No Access |

FIG. 2C — ACL-2

| ACL-2 | Security Personnel | Regular Employee | Fire Department |
|---|---|---|---|
| Thermostat | Full Control | Read Only | Shut Off Furnace |
| Main Entry | Full Control | Unlock Only | No Access |

SYSTEM, APPARATUS AND METHOD FOR STATEFUL APPLICATION OF CONTROL DATA IN A DEVICE

This application claims priority to U.S. Provisional Patent Application No. 62/172,968, filed on Jun. 9, 2015, in the names of Nathan Heldt-Sheller and Ned M. Smith, entitled STATEFUL APPLICATION OF CONTROL DATA ON IOT DEVICES, the disclosure of which is hereby incorporated by reference.

BACKGROUND

Internet of Things (IoT) systems balance sometimes conflicting tradeoffs between safety, security, resiliency and availability. For example, under normal operating conditions availability of sensors, controllers and actuators may be of paramount importance. System objectives may change given operational status change of connected IoT devices. IoTivity is a Linux Foundation open source example IoT framework where security integration is a central design objective. A primary challenge facing IoT framework designers is how IoT devices may utilize access control lists (ACLs), credentials, keys, or other data, to realize intended system behavior objectives.

BRIEF DESCRIPTION OF DRAWINGS

FIG. 2A is a block diagram of a database including access control lists in accordance with an embodiment of the present invention.

FIG. 2B is a block diagram of an access control list in accordance with an embodiment of the present invention.

FIG. 2C is a block diagram of another access control list in accordance with an embodiment of the present invention.

DETAILED DESCRIPTION

Figure 1:
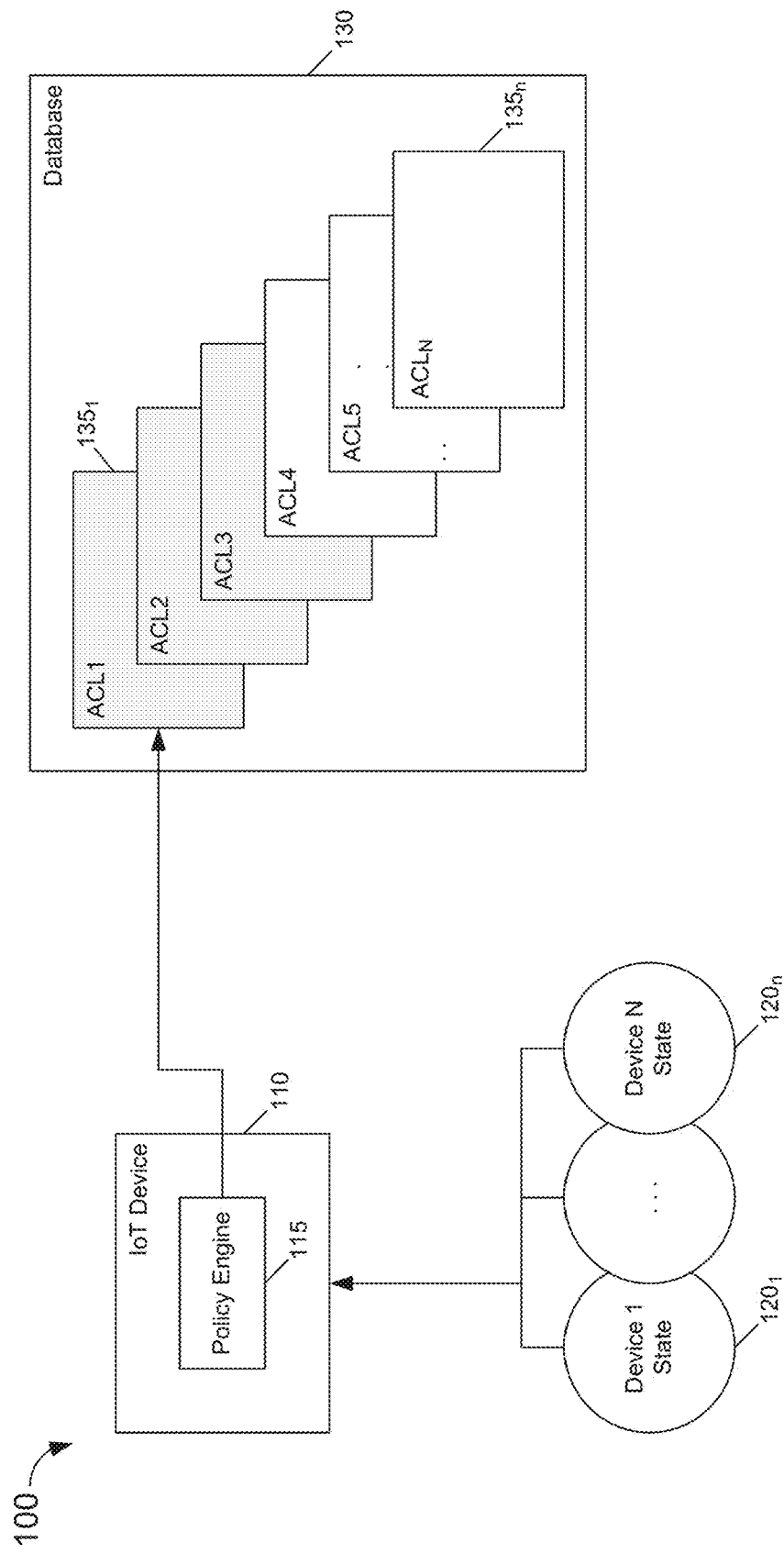
FIG. 1 is a block diagram of an environment in accordance with an embodiment of the present invention.

In various embodiments, computing devices such as IoT devices may operate in a given one of a variety of device states. Such device states may in some cases take the form of a composite device state in which a plurality of individual device state factors collectively form a composite or final device state of the device. Understand that depending on context, the term "device state" as used herein may refer to this collective final device state or may refer to a single device state factor of multiple such device state factors. As will be described below, security policy decisions may take into account a device state in which the device is operating when applying a particular access control policy. Such operation is enabled by including state information (namely device state information) in a variety of different types of control data to be processed and/or communicated by the device. Understand that as used herein, "control data" may refer to a variety of information types regarding security policies including, but not limited to, access control lists (ACLs), credentials, keys and so forth.

Understand that the types of information that can be included in device state may take many different forms. In example embodiments different categories of device states are possible. More specifically, in one embodiment one device state category may relate to manageability states, such as device configuration states, examples of which are discussed below. Another category of device states may include operational and control states (including but not limited to safety-related states). A still further category of device states may include taxonomy-related device states such as local/remote, device types, present components or so forth. Of course understand that in other embodiments many other different types of information may be encoded as a device state field or factor.

Correct and complete definition of control data in the absence of state information as described herein can be a difficult and error prone task, particularly because system behavior objectives may change based on IoT device state. For example, an ACL which allows an auto dealership to reset certain in-vehicle infotainment (IVI) IoT devices may be disabled when the vehicle is in motion. In another example, a company may allow a snowplow service to open their IoT front gate only when IoT temperature sensors determine that it is near or below freezing. In a third example, an IoT door lock may allow emergency personnel to enter when a connected IoT smoke alarm detects dangerous smoke levels in the building.

Embodiments may enhance security and IoT device behavior by incorporating explicit state information to existing control data, such that it is clear and deterministic when a particular control objective is, and is not, meant to be applied to the device. This not only enables a richer definition of control data, but also simplifies the understanding of potential device states for a control data author. In addition, further power/performance benefits are described below.

In various embodiments IoT device control data can be mapped onto existing device state information by explicitly tagging control data with state information, which in one embodiment may be included as one or more state flags. When the IoT device is making a policy decision, such as whether or not to allow access to a certain requester, the state flags attached to or included with control data are checked against device state (where device state may include the state of one or more of a set of connected devices as well as the local device state) before applying the control data to policy decisions.

Embodiments provide IoT control data descriptions including a mapping of device state into a control data database. Using embodiments, the following may be achieved: the correct description of complex system behavior by IoT devices, in a direct and intuitive way; a data author may have a concise description of device state possibilities to consider, which improves the ability to correctly describe intended behavior; and the device behavior can be explicit and deterministic when deployed, reducing the potential for erroneous application of control data by the device software.

In the IoTivity IoT framework, control data is applied by a security resource manager module (SRM), also referred to herein as a policy engine. The SRM loads a database of control data. The control data database is applied by the SRM to filter incoming requests, and grant (or deny) access.

Control data expressed as ACLs may have multiple vectors of state information. For example, many ACL structures include a 'date/time' state vector, specifying the time window in which the ACL is valid. Embodiments provide additional state vectors including an operational criticality state. There may be multiple levels of criticality ranging from a low criticality, to a high criticality. Intermediate criticality levels may be enumerated as well. Furthermore, operational state may be expressed in terms of an operational optimization goal where a current operational status may optimize for performance while a second operational goal may optimize for power. Additional operational goals may optimize for safety, resiliency, availability and so forth.

In some embodiments, the various states (time, criticality, operation, etc.) are not mutually exclusive, and thus may be applied in combination with each other. For each valid combination there is a single final state that the device possesses and a control data element (e.g., ACL) that is tied to that state. Hence, security may be consistently and correctly applied at each defined device states.

Using an embodiment, control data is self-describing, such that the SRM's policy engine would not need to make complex and error-prone decisions regarding when to apply control data. Explicit flags on the control data could enable that data only when the device is in the appropriate state, without the policy engine having to interpret and implement the intended system behavior.

IoT devices, which are often constrained, can make simple optimization decisions for power and performance using the device states (e.g., flags) on control data. For example, a device which changes control state infrequently, such as a light bulb, can elect to only load into its local memory those control data which apply to its current state. Given the amount of data which may apply only to unusual states, and the highly constrained nature of IoT devices, these savings could be significant.

That is, in embodiments a constrained IoT device, such as a device with relatively limited amounts of processing and storage capabilities, may be configured to store a relatively small set of ACLs or other control data. Namely, in the example above such constrained devices may be configured to store one or few ACLs that match a current device state. It is understood that in such cases, additional ACLs that may be applicable to the device may be stored in an authoritative policy storage, such as associated with a remote access manager service (AMS) or other entity. Further by on-boarding a limited number of ACLs, a security policy determination may be performed at higher performance levels. As an example in which a security policy operation includes a matching function to determine what (if any) locally stored ACLs are applicable to a given request, an index database that stores a representation of the applicable device states of the locally stored ACLs can be quickly and efficiently analyzed to determine the matching ACLs. Note that this index database may also be stored in the device (and updated on a device state change) for ready access to identify matching ACLs responsive to a received request for access to a resource. Such matching ACLs can then be accessed and processed/analyzed to apply the access policy therein to the request. In an embodiment, the SRM may vet these matching ACLs by way of referential integrity checks over the ACL content. If conflicting ACL policies are found (namely a first ACL that matches a subject S1 that defines a permission P1 for a resource R1 and a second ACL that identifies S1 and R1 but specifies a different permission P2), the SRM would flag these ACLs as being in conflict and seek a resolution. In an embodiment, SRM evaluation logic will ensure that security is not compromised (even if conflicting ACLs are found) by selecting the least privilege granted by P1 and P2. For example, the intersection of P1 and P2 would be the privilege granted, or no permission would be granted.

In such embodiments, locally stored ACLs can be paged in and out from a local device to further portions of a security policy storage hierarchy as device state changes. In such an example, ACLs that match the current device state may be stored locally, while ACLs of a previous device state may be stored in an intermediate cache, such as an ACL cache associated with an intermediary device such as a primary or secondary controller that is located in a common portion of an IoT network. Instead, relatively infrequently active device states and matching ACLs may be stored more remotely, in an authoritative security policy storage. Understand that in some cases, in addition to locally storing ACLs matching a current device state, one or more critical ACLs, which may not match current device state but are associated with critical operation of the device, also may be stored locally.

Thus device state as represented within control data such as ACLs may act as a pre-filter to determine what set of the control data is to be applied for a particular request for access to a given resource. Such pre-filtering operation performed based on matching of current device state to the device state represented in the control data may generate a smaller set of control data (e.g., ACLs) that are then to be applied, by a policy engine or other logic, to determine whether a given request for access to a resource is to be granted.

Referring now to FIG. 1, shown is an environment 100, which may a portion of an IoT network in accordance with an embodiment of the present invention. As illustrated, environment 100 includes an IoT device 110 that couples to a database 130. In an embodiment, database 130 may be stored in a storage of device 110. In other cases, device 110 may communicate wirelessly with database 130, e.g., via a local or short range wireless area network, where database 130 may be part of a policy cache hierarchy, which may be implemented in a primary or secondary controller coupled to device 110. Still further in other cases, database 130 may be associated with a more remote portion of an IoT network such as an AMS. Note that such AMS may be remotely located from IoT device 110, and may couple to IoT device 110 via one or more intermediary devices such as primary and/or secondary controllers.

To perform security policy checks, IoT device 110 includes a policy engine 115 (which in an embodiment may implement a SRM). In an embodiment, policy engine 115 may be implemented in a secure environment of the IoT device, such as a trusted execution environment (TEE). In various embodiments, the TEE and policy engine 115 may be implemented via combinations of hardware circuitry, software and/or firmware. More specifically, policy engine 115 may be configured to receive and process an incoming access request from a given requester to a particular protected resource (not shown for ease of illustration). Although the scope of the present invention is not limited in this regard, such protected resource may be an internal resource of IoT device 110, such as information stored in a particular storage of the IoT device. In other cases, IoT device 110 may perform security policy decisions for external resources such as various sensors, actuators or other devices within the IoT network and for which device 110 protects access.

To determine whether to grant access for a corresponding request, policy engine 115 may seek to access information of one or more control data, such as one or more ACLs. Specifically as shown in FIG. 1, a plurality of ACLs $135_1$-$135_n$ are present within database 130. In an embodiment, each ACL may be associated with one or more particular resources to be protected and/or one or more particular requesters that seek access to the requested resource.

To simplify security policy, improve performance and potentially reduce power consumption, embodiments may, as an initial operation within a security policy enforcement mechanism, determine whether one or more security policies are to be applied based on device state. As shown in FIG. 1, IoT device 110 receives a plurality of device state inputs $120_1$-$120_n$. Each such input may provide a device state factor of device 110 or for another device within the IoT network. Using device state information, policy engine 115 may as an initial matter determine whether a given control data (e.g., ACL) is to be applied based on the determined (e.g., composite) current device state. Thus as illustrated in FIG. 1, of ACLs $135_1$-$135_n$, only a limited number of ACLs may potentially be applied for the current device state (e.g., the shaded ACLs). In this way, security policy decisions can be made more efficiently.

Referring now to FIG. 2A, shown is a block diagram of a database including several access control lists in accordance with an embodiment of the present invention. As shown in FIG. 2A, a database 200, which may be implemented within a storage of a system, includes ACLs 212 and 214. Understand that the ACLs may be illustrated in a user interface of a network authoring tool to enable an end user to determine security policy by generation of these ACLs (and constituent applicable devices states). Note that only two such ACLs 212 and 214 are shown for ease of illustration. In the view of FIG. 2A, each ACL includes a name field 215, which may be used to identify the corresponding ACL. In addition, a plurality of device state fields $216_0$-$216_n$ are shown. Understand that while particular fields are shown for illustrative purposes, many more and different fields may be present in other embodiments. As described herein, these fields 216 may be included in or associated with the given ACL.

As illustrated, each field 216 associated with a given device state may be in one of two states, namely a set state (as illustrated with a "X"), which may be indicated within the ACL as a logic high or one value, and a reset or logic zero state (the "blank" fields shown in FIG. 2A). Note that these fields may be set by a control data author to indicate whether the corresponding ACL is to be applied when the device is in a given state.

As seen in FIG. 2A, possible device states include an operational state (isOp) to indicate whether the ACL is to be applied when the device is in an operational state; an owned state (isOwned) to indicate whether the ACL is to be applied when the device is identified as being owned by a particular owner; a provisioned state (isProv) to indicate whether the ACL is to be applied when the device has been provisioned; a key state (hasKeys) to indicate whether the ACL is to be applied when the device has one or more specific keys present within the device; a reset state (inReset) to indicate whether the ACL is to be applied when the device is in a reset state; a connection state (isConnect) to indicate whether the ACL is to be applied when the device is connected within a particular IoT network; an error state (inError) to indicate whether the ACL is to be applied when the device is in an error state; and an emergency state (inEmergency) to indicate whether the ACL is to be applied when the device is in an emergency state. With reference to ACL 212, note that this access control list would be applied if the device is in all of an operational state, an owned state, a provisioned state, a key state, and a connection state. Instead if the device is indicated to be in any of a reset state, error state, or emergency state, ACL 212 is not to be applied.

As illustrated in FIG. 2B, details of an access control list in accordance with an embodiment are shown. In FIG. 2B, ACL 212 provides control data for two resources, namely a thermostat resource 222, and a main entry resource 224, which may be provisioned by the network authoring tool to a particular IoT device that protects these resources, which may be resources of an entity to be protected by this ACL. In addition, the ACL provides an indication of a permission grant to particular requesters, as indicated by requester fields $226_0$-$226_n$. Each such field 226 indicates a type of permission (if any) to be granted to the requester for the particular resource. Thus as shown for example, security personnel may have full control of both thermostat 222 and main entry 224. Similar fields are present in ACL 214 of FIG. 2C.

Figure 3:
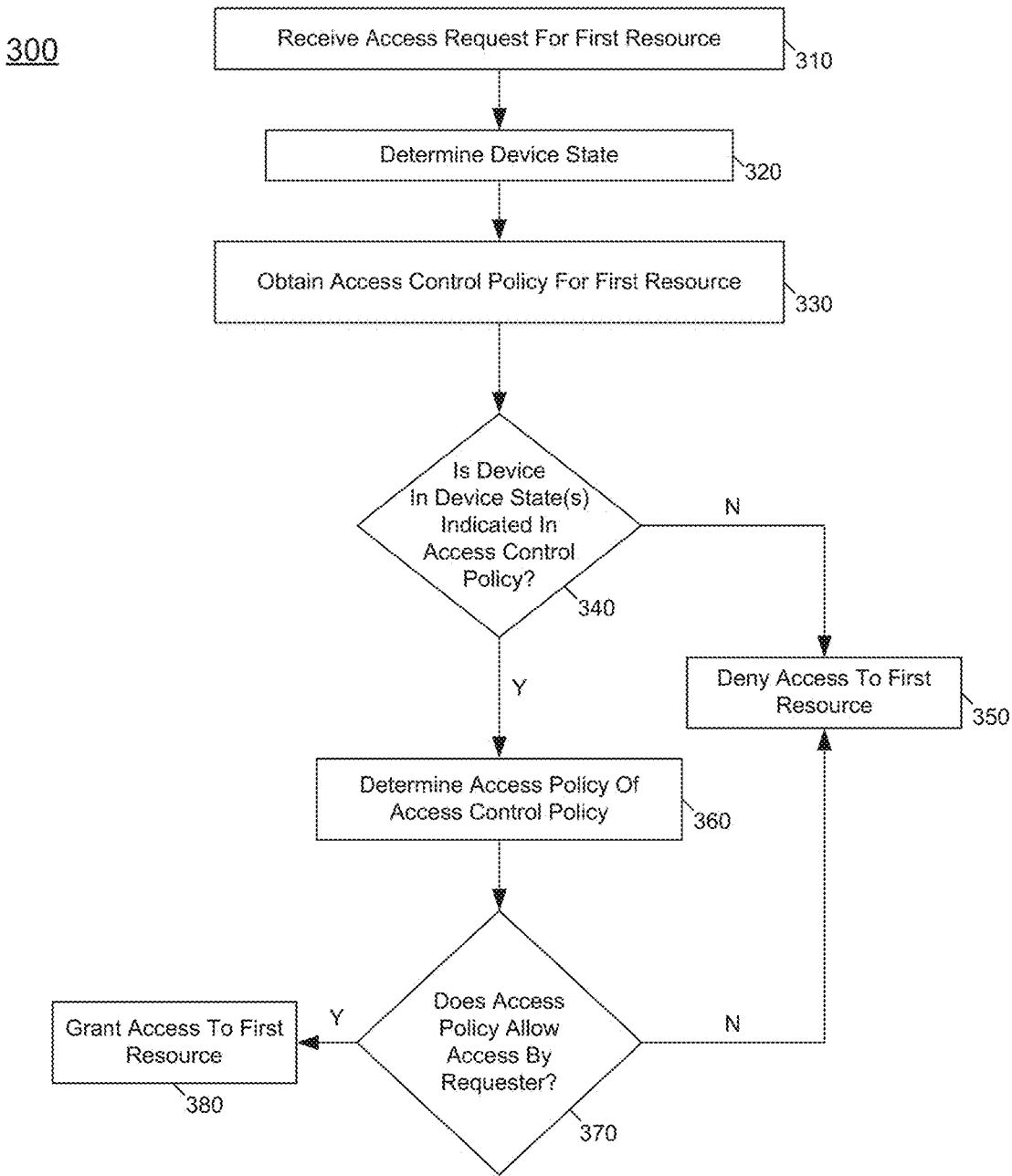
FIG. 3 is a flow diagram of a method in accordance with an embodiment of the present invention.

Referring now to FIG. 3, shown is a flow diagram of a method in accordance with an embodiment of the present invention. More specifically, method 300 may be performed by a policy engine of a given device, which may be implemented in a TEE of the device. As seen, method 300 begins by receiving an access request for a first resource (block 310). Understand that this access request may be received from a given requester that seeks access to a resource, which may be internal or external to the device. Next at block 320 the device state is determined. Understand that this device state may be a composite state for a variety of different device state factors of the device (and which in some embodiments may further include device state of one or more other devices coupled in an IoT network with the device). Next at block 330 an access control policy (e.g., an ACL) may be obtained for the first resource. Note that this access control policy may be locally stored or may be accessed from a remote location. In other cases multiple ACLs may be obtained that are relevant to the security policy determination.

Next at diamond 340 it is determined whether the device is in the device state (or states) indicated in the access control policy. For a multi-factor device state situation, this determination may indicate whether all set device states indicated in a device state vector or set device fields of the access control policy are met (e.g., present/true/active). If not, control passes to block 350 where access to the first resource is denied (without any further application of the request to the access control policy).

Instead if at diamond 340 it is determined that the device is in the indicated device state(s), control passes to block 360 where the access policy of the access control policy may be determined. This determination may include identifying the requester and determining the type of access to the resource to be granted (or not) to such requester. Thus at diamond 370 it is determined whether the access policy allows the requested access by the requester. If not, control passes back to block 350 discussed above. Otherwise, control passes to block 380, where access to the first request can be granted. Understand while shown at this high level in the embodiment of FIG. 3, many variations and alternatives are possible.

As discussed above, in some situations, such as in the context of a constrained IoT device, device state may be used to enable local storage of only a limited amount of control data associated with a particular IoT device. In such cases, the IoT device may be configured to page in and out control data such as ACLs based on a current device state.

Figure 4:
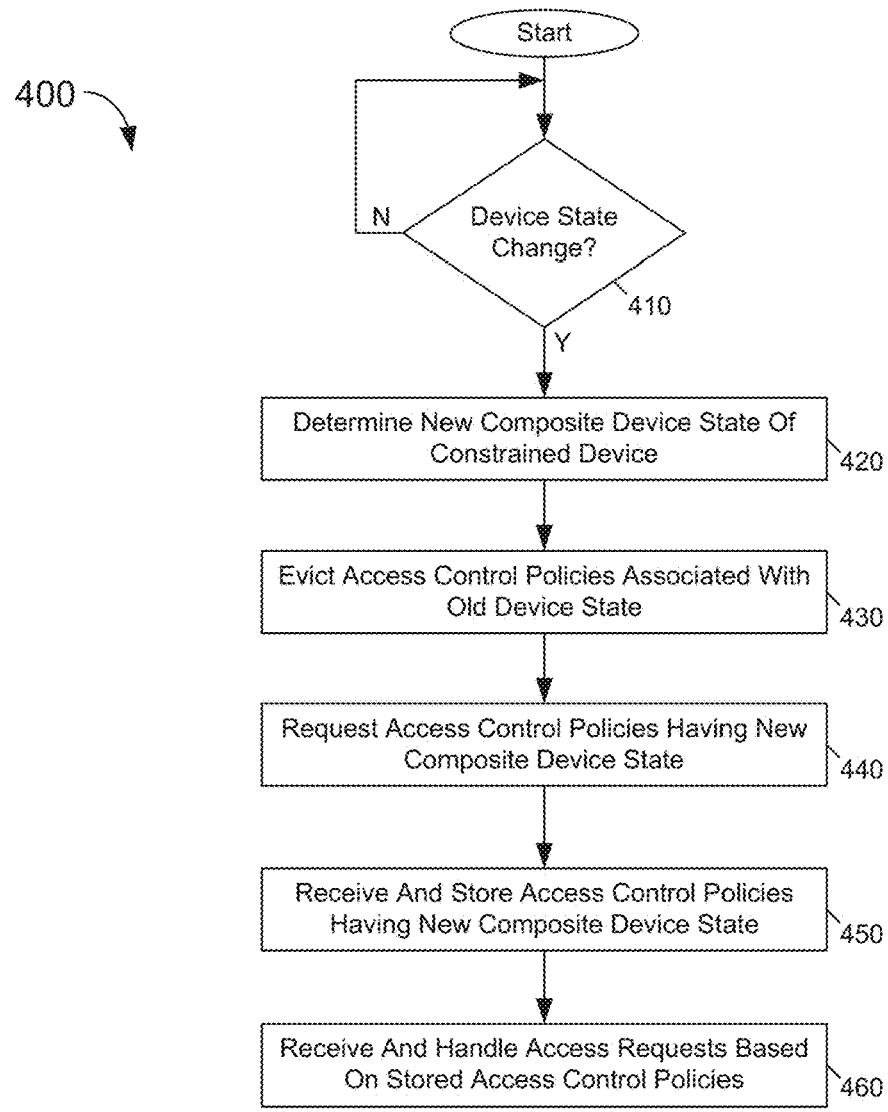
FIG. 4 is a flow diagram of a method in accordance with another embodiment of the present invention.

Referring now to FIG. 4, shown is a flow diagram of a method in accordance with another embodiment of the present invention. As shown in FIG. 4, method 400 may be implemented within a constrained IoT device to enable efficient storage and access to limited amounts of local ACLs or other control data. As an example, a policy engine that executes within a TEE of the constrained IoT device may perform method 400. As seen, method 400 begins by determining whether a device state change has occurred (diamond 410). If so, control passes to block 420 where a new composite device state may be determined for the constrained device. More specifically, the various device state fields or factors can be analyzed to determine a composite device state. Then at block 430 any locally stored ACPs associated with an old device state may be evicted (e.g., to a more remote portion of a policy storage cache hierarchy). Note that in some cases, one or more other security policies, such as a critical security policy may continue to be locally stored even where such policy is not associated with the new composite device state, such that this policy may be present, regardless of connection conditions.

Next, at block 440 one or more ACPs having the new composite device state can be requested. In an embodiment, this request may be made to an AMS that is located remotely from the IoT device. In other cases, this request may proceed through a security policy storage hierarchy that may include one or more intermediary devices between the IoT device and the authoritative policy storage provider (such as an AMS).

Still with reference to FIG. 4, next at block 450 one or more ACPs having the new composite device state may be received and stored locally. Finally, at block 460 incoming access requests may be received and handled based on the stored ACPs. Understand while shown at this high level in the embodiment of FIG. 4, many variations and alternatives are possible.

Embodiments may also have implications to control data authoring. An IoT device control data authoring tool may expose all known device state variables as enabling flags for a control data object, on itself or other IoT device(s). As examples the ACLs of FIG. 2B and FIG. 2C may be presented (and generated) using a user interface of an example authoring tool in accordance with an embodiment, and gated or pre-filtered using the device states shown in FIG. 2A. In this way, a policy author can have a higher degree of confidence that the control data being defined will result in the intended system behavior.

In an implementation such as IoTivity, there are a variety of ways in which the device may become aware of input state. For example, for ACL validity periods, a clock is used. Likewise, for criticality states, temperature, pressure, humidity, air quality, energy flow etc., may inform this class of states. Operational optimization states may be informed by battery charging sensors, motion, acceleration, utility costs of power, communication resources etc. All of these inputs can be fused or combined through inference to inform and direct state transitions. These states then become a set of inputs into the control data authoring process, alleviating the need for the policy engine (which applies the control data) to make complex inferences between device state and control objectives.

Using an embodiment, IoT devices may have higher quality control data, resulting in a better user experience for IoT devices. In addition, constrained IoT devices may have an improved memory footprint and working set size, resulting in improved power/performance and/or reduced bill of material (BoM) cost.

Figure 5:
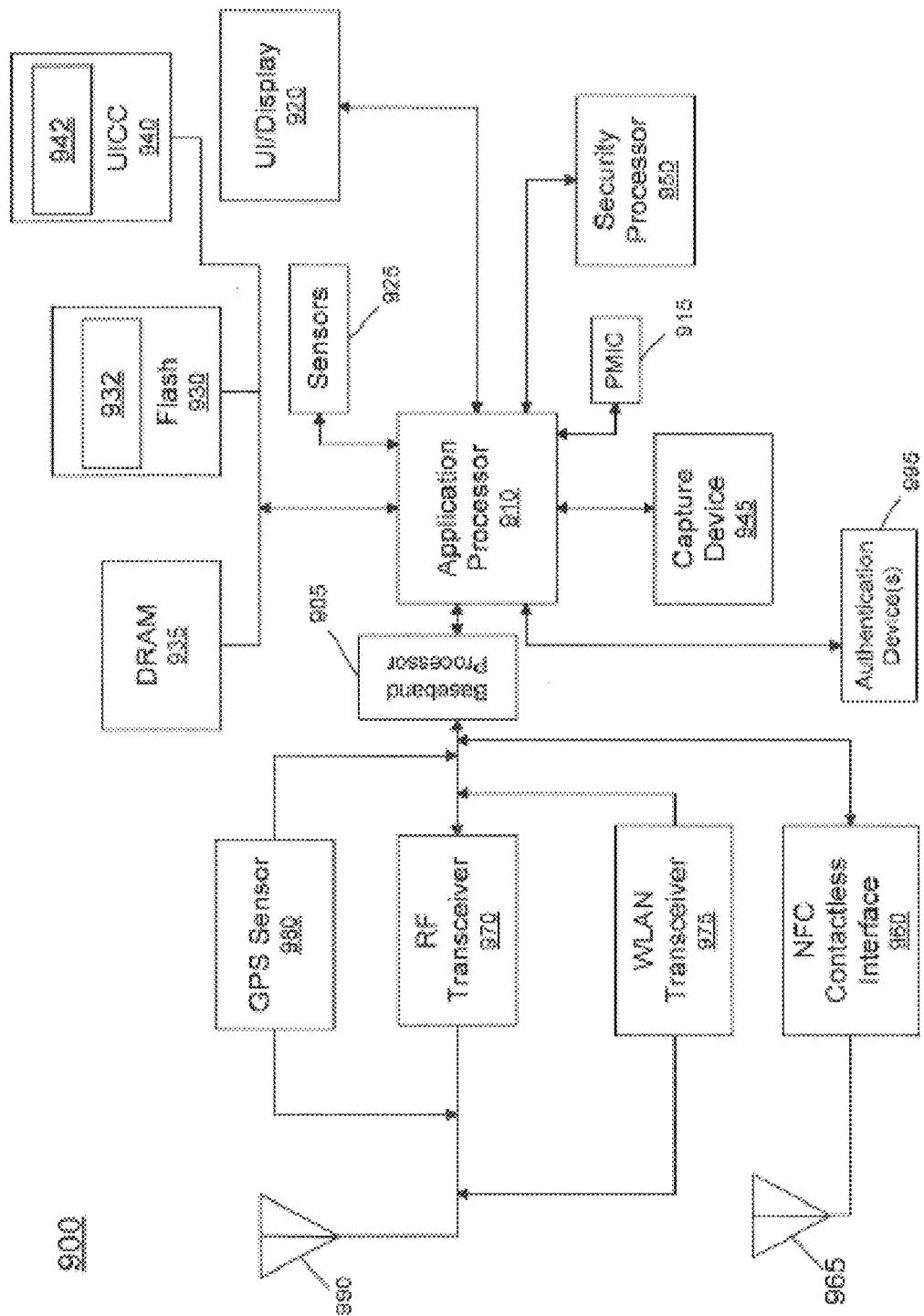
FIG. 5 is a block diagram of an example system with which embodiments can be used.

Referring now to FIG. 5, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 5, a universal integrated circuit card (UICC) 940 comprises a subscriber identity module, which in some embodiments includes a secure storage 942 to store secure user information. System 900 may further include a security processor 950 that may that may implement a TEE as described earlier, and which may couple to application processor 910. Furthermore, application processor 910 may implement a secure mode of operation, such as Intel® Software Guard Extensions (SGX) to a given instruction set architecture and circuitry to host a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

Note that one or more inference engines may be implemented in processor 910 and/or among the various controllers and co-processors such as baseband processor 905, security processor 950, sensors 925, display/user interface 920 and so forth. In some embodiments, sensors 925 may include a sensor hub having a sensing engine, sensor interface concentrator and sensor fusion and inference engine logic.

As further illustrated, a near field communication (NFC) contactless interface 960 is provided that communicates in a NFC near field via an NFC antenna 965. While separate antennae are shown in FIG. 5, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 6:
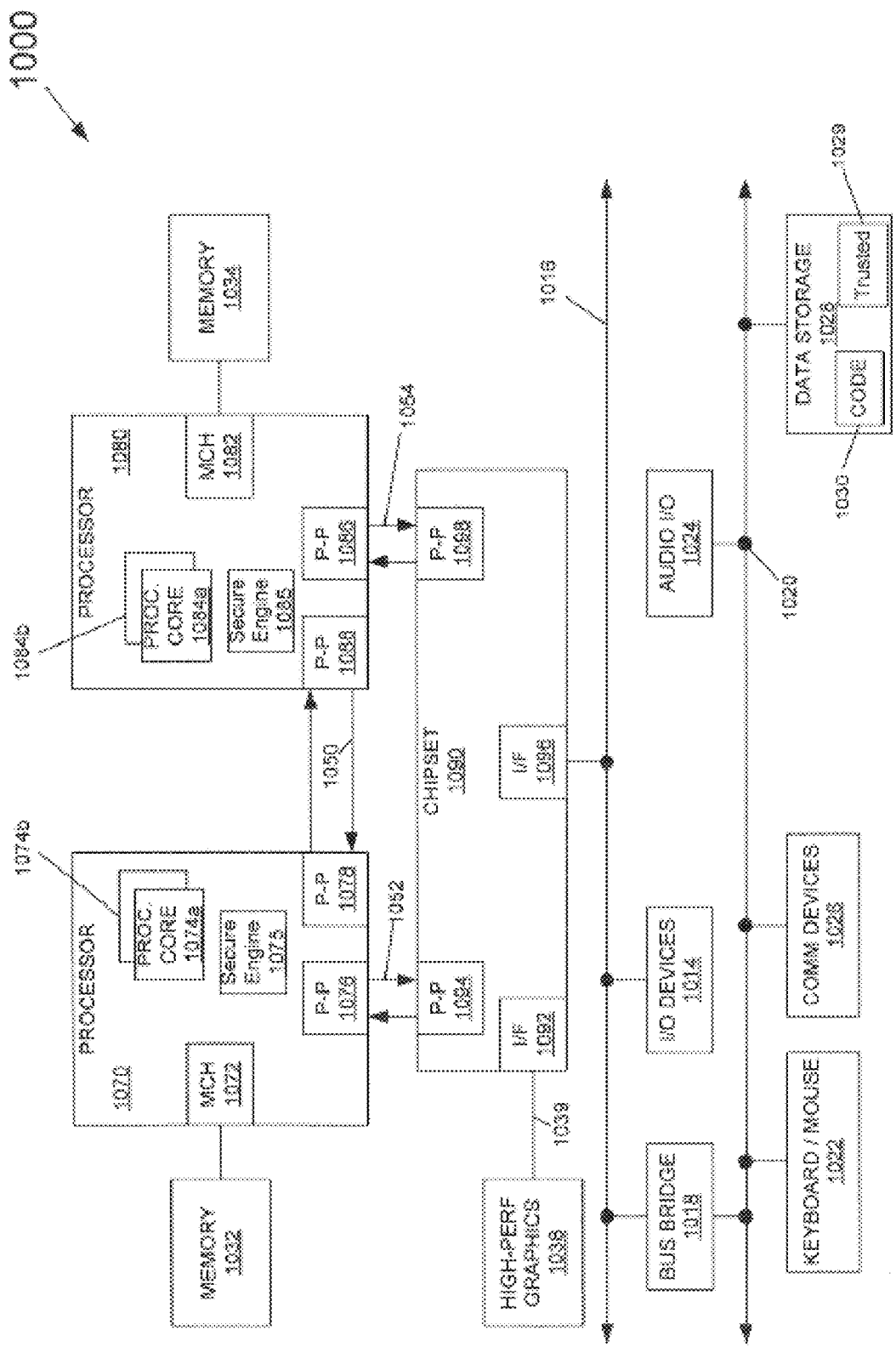
FIG. 6 is a block diagram of a system in accordance with another embodiment of the present invention.

Referring now to FIG. 6, shown is a block diagram of a system in accordance with another embodiment of the present invention. As shown in FIG. 6, multiprocessor system 1000 is a point-to-point interconnect system such as a server system, and includes a first processor 1070 and a second processor 1080 coupled via a point-to-point interconnect 1050. As shown in FIG. 6, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding, access control policy handling, or so forth.

Still referring to FIG. 6, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 6, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 7:
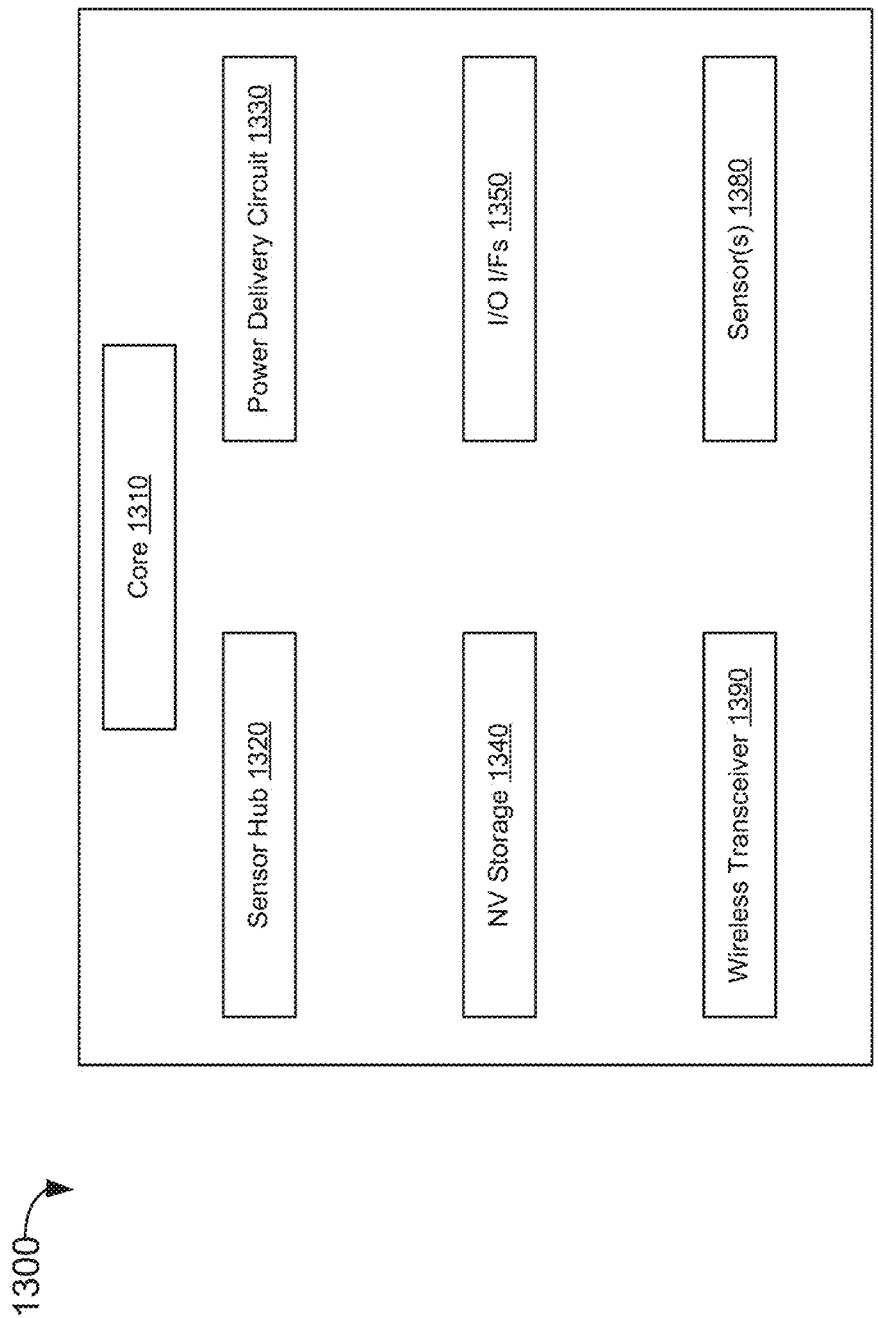
FIG. 7 is a block diagram of a wearable module in accordance with another embodiment.

Embodiments may be used in environments where IoT devices may include wearable devices or other small form factor IoT devices. Referring now to FIG. 7, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms.

The following Examples pertain to further embodiments.

In Example 1, a device comprises: a processor to execute instructions; and a policy logic to receive a request to access a resource to be protected by the device, where the policy logic is to access control data associated with the resource, the control data having a first device state field of a first value. The policy logic may be configured to determine whether the device is in a device state associated with the first value and if so to apply an access policy of the control data to determine whether to grant the request to access the resource.

In Example 2, the control data comprises an access control list including a plurality of device state fields, each to indicate whether the access policy of the access control list is to be applied when the device is in the corresponding device state.

In Example 3, one of the plurality of device state fields comprises an operational criticality state of the device.

In Example 4, one of the plurality of device state fields comprises an operational optimization goal of the device.

In Example 5, the policy logic of one or more of the above Examples is to receive a plurality of device state inputs and determine whether each of the plurality of device state inputs matches a value stored in a corresponding one of the plurality of device state fields of the control data.

On Example 6, at least one of the plurality of device state inputs is to be received from one or more second devices coupled to the device via a network.

In Example 7, the control data comprises at least one state vector including a plurality of fields each for a device state factor and to indicate whether the access policy of the control data is to be applied when the device state factor is valid in the device.

In Example 8, the device of one or more of the above Examples further comprises a storage to store an index, the index comprising a plurality of entries each associated with one of a plurality of control data and to indicate a composite device state of the device in which the policy logic is to apply the associated control data to an access request.

In Example 9, the device of one or more of the above Examples further comprises a storage to store a plurality of control data. The policy logic may be configured to obtain the plurality of control data from an authoritative policy storage of a network, based on a current composite device state of the device.

In Example 10, the policy logic of Example 9 is to evict one or more of the plurality of control data responsive to a change to the current composite device state.

In Example 11, the policy logic of one or more of the above Examples is to pre-filter a plurality of control data based on the device state of the device, and to access the control data based on a result of the pre-filter.

In Example 12, a method comprises: determining a device state for a system comprising an IoT device; determining whether an access control list associated with a resource is to be applied when the system is in the determined device state; and if the access control list is determined to be applied when the system is in the determined device state, determining whether a requester is to be granted access to the resource based on the access control list, and otherwise preventing the access without further application of the access control list.

In Example 13, the method further comprises requesting and obtaining the access control list from an authoritative policy storage located remotely from the system responsive to a device state change of the system.

In Example 14, the method further comprises accessing an index comprising a plurality of entries each associated with one of a plurality of access control lists and to indicate a composite device state of the system in which a policy logic of the system is to apply the associated access control list to an access request, to determine whether the access control list is to be applied.

In Example 15, the method further comprises accessing a plurality of access control lists associated with the resource, each of the plurality of access control lists comprising a composite device state matching a composite device state of the system.

On Example 16, the method further comprises evicting from a storage of the system one or more of the plurality of access control lists responsive to a change to the composite device state.

In Example 17, the method further comprises granting the requester the access to the resource based on at least some of the accessed plurality of access control lists.

In another Example, a computer readable medium including instructions is to perform the method of any of the above Examples.

In another Example, a computer readable medium including data is to be used by at least one machine to fabricate at least one integrated circuit to perform the method of any one of the above Examples.

In another Example, an apparatus comprises means for performing the method of any one of the above Examples.

In Example 18, a system comprises: a processor having a first logic to execute in a trusted execution environment; and a storage to store a plurality of access control policies, each of the plurality of access control policies associated with a composite device state of the system and including an access policy for a resource to be protected by the first logic. The first logic may be configured to apply one or more of the plurality of access control policies to a request for access to the resource, responsive to a matching of the associated composite device state of the one or more access control policies with a current composite device state of the system.

In Example 19, the composite device state associated with a first access control policy includes a plurality of device state fields, each having one of a first value to indicate that a corresponding device state factor of the current composite device state of the system is to be valid or a second value to indicate that the corresponding device state factor of the current composite device state of the system is to be invalid.

In Example 20, the storage is to store an index having a plurality of entries each associated with one of the plurality of access control policies and to store the first value or the second value for the plurality of device state fields.

In Example 21, the first logic is to access the index to identify the one or more of the plurality of access control policies for application to the request for access.

In Example 22, the system of one or more of the above Examples further comprises a plurality of sensors to provide one or more device state factors of the current composite device state, where at least one of the plurality of sensors is to couple to the processor via a control channel to provide the one or more device state factors.

In Example 23, a system comprises: means for executing in a trusted execution environment; storage means for storing a plurality of access control policies, each of the plurality of access control policies associated with a composite device state of the system and including an access policy for a resource to be protected; and means for applying one or more of the plurality of access control policies to a request for access to the resource, responsive to a matching of the associated composite device state of the one or more access control policies with a current composite device state of the system.

In Example 24, the storage means is to store an index having a plurality of entries each associated with one of the plurality of access control policies and to store a first value or a second value for a plurality of device state fields.

In Example 25, the system further comprises means for accessing the index to identify the one or more of the plurality of access control policies for application to the request for access.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A device comprising:
a processor to execute instructions; and
a policy logic to receive a request from a requester coupled to the device to access a resource to be protected by the device, wherein the policy logic is to access control data associated with the resource, the control data having a first device state field of a first value to indicate a device state of the device, the policy logic to determine whether the device is in a current composite device state of the device that matches an associated composite device state of the control data with the first value and if so to apply an access policy of the control data to determine whether to grant the request to allow the requester to access the resource, wherein the control data comprises an access control list, the access control list including a plurality of device state fields, each having one of a first value to indicate that a corresponding device state factor of the current composite device state of the device is to be valid or a second value to indicate that the corresponding device state factor of the current composite device state of the device is to be invalid, and wherein the policy logic is to access an index database to perform the matching, the index database having a plurality of entries each associated with one of a plurality of control data and to store the first value or the second value for the plurality of device state fields.

2. The device of claim 1, wherein one of the plurality of device state fields comprises an operational criticality state of the device.

3. The device of claim 1, wherein one of the plurality of device state fields comprises an operational optimization goal of the device.

4. The device of claim 1, wherein the policy logic is to receive a plurality of device state inputs and determine whether each of the plurality of device state inputs matches a value stored in a corresponding one of the plurality of device state fields of the control data.

5. The device of claim 4, wherein at least one of the plurality of device state inputs is to be received from one or more second devices coupled to the device via a network.

6. The device of claim 1, wherein the control data comprises at least one state vector including a plurality of fields each for a device state factor and to indicate whether the access policy of the control data is to be applied when the device state factor is valid in the device.

7. The device of claim 1, further comprising a storage to store the index database.

8. The device of claim 1, further comprising a storage to store the plurality of control data, wherein the policy logic is to obtain the plurality of control data from an authoritative policy storage of a network, based on the current composite device state of the device.

9. The device of claim 8, wherein the policy logic is to evict one or more of the plurality of control data responsive to a change to the current composite device state.

10. The device of claim 1, wherein the policy logic is to pre-filter a plurality of control data based on the device state of the device, and to access the control data based on a result of the pre-filter.

11. At least one non-transitory computer readable storage medium comprising instructions that when executed enable a system to:
determine a current composite device state for the system, the system comprising an Internet of Things (IoT) device;
determine whether an access control list associated with a resource is to be applied when the system is in the determined current composite device state based upon an associated composite device state of the access control list, the access control list including a plurality of device state fields, each having one of a first value to indicate that a corresponding device state factor of the current composite device state of the system is to be valid or a second value to indicate that the corresponding device state factor of the current composite device state of the system is to be invalid, the determination based on access to an index database having a plurality of entries each associated with one of a plurality of access control lists and to store the first value or the second value for the plurality of device state fields; and
if the access control list is determined to be applied when the system is in the determined device state, determine whether a requester coupled to the system is to be granted access to the resource based on the access control list, and otherwise prevent the access by the requester without further application of the access control list.

12. The at least one non-transitory computer readable storage medium of claim 11, further comprising instructions that when executed enable the system to request and obtain the access control list from an authoritative policy storage located remotely from the system responsive to a device state change of the system.

13. The at least one non-transitory computer readable storage medium of claim 11, further comprising instructions that when executed enable the system to access the plurality of access control lists associated with the resource, each of the plurality of access control lists comprising a composite device state matching a composite device state of the system.

14. The at least one non-transitory computer readable storage medium of claim 13, further comprising instructions that when executed enable the system to evict from a storage of the system one or more of the plurality of access control lists responsive to a change to the composite device state.

15. The at least one non-transitory computer readable storage medium of claim 13, further comprising instructions that when executed enable the system to grant the requester the access to the resource based on at least some of the accessed plurality of access control lists.

16. A system comprising:
a hardware processor having a first logic to execute in a trusted execution environment; and
a storage to store a plurality of access control policies, each of the plurality of access control policies associated with a composite device state of the system and including an access policy for a resource to be protected by the first logic, wherein the first logic is to apply one or more of the plurality of access control policies to a request for access to the resource, responsive to a matching of the associated composite device state of the one or more access control policies with a current composite device state of the system, wherein the composite device state associated with a first access control policy includes a plurality of device state fields, each having one of a first value to indicate that a corresponding device state factor of the current composite device state of the system is to be valid or a second value to indicate that the corresponding device state factor of the current composite device state of the system is to be invalid, wherein the storage is further to store an index database having a plurality of entries each associated with one of the plurality of access control policies and to store the first value or the second value for the plurality of device state fields, the first logic to access the index database to perform the matching.

17. The system of claim 16, further comprising a plurality of sensors to provide one or more device state factors of the current composite device state, wherein at least one of the plurality of sensors is to couple to the processor via a control channel to provide the one or more device state factors.

* * * * *